(12) United States Patent
Sato et al.

(10) Patent No.: US 8,330,415 B2
(45) Date of Patent: Dec. 11, 2012

(54) CHARGE/DISCHARGE CONTROL APPARATUS

(75) Inventors: Yasuo Sato, Chiba (JP); Takao Matsuzaki, Kitaibaraki (JP); Masahiro Watanabe, Hitachi (JP); Yasushi Tomita, Mito (JP)

(73) Assignee: Hitachi, Ltd., Tokyo (JP)

( * ) Notice: Subject to any disclaimer, the term of this patent is extended or adjusted under 35 U.S.C. 154(b) by 543 days.

(21) Appl. No.: 12/541,198

(22) Filed: Aug. 14, 2009

(65) Prior Publication Data

US 2010/0076825 A1    Mar. 25, 2010

(30) Foreign Application Priority Data

Sep. 25, 2008   (JP) .................................. 2008-246550

(51) Int. Cl.
 *H02J 7/00* (2006.01)
(52) U.S. Cl. ......................... 320/109; 701/22; 180/65.29
(58) Field of Classification Search .................... 320/109
See application file for complete search history.

(56) References Cited

U.S. PATENT DOCUMENTS

| | | | |
|---|---|---|---|
| 7,013,205 B1 * | 3/2006 | Hafner et al. ................... | 701/22 |
| 2006/0122738 A1 | 6/2006 | Yamada et al. | |
| 2008/0039989 A1 * | 2/2008 | Pollack et al. ................. | 701/22 |
| 2008/0052145 A1 * | 2/2008 | Kaplan et al. ..................... | 705/8 |
| 2009/0192655 A1 | 7/2009 | Ichikawa et al. | |
| 2009/0229900 A1 * | 9/2009 | Hafner et al. ............ | 180/65.275 |
| 2009/0315512 A1 | 12/2009 | Ichikawa et al. | |

FOREIGN PATENT DOCUMENTS

| | | |
|---|---|---|
| JP | 2004-227262 | 8/2004 |
| JP | 2004-364463 | 12/2004 |
| JP | 2006-163576 | 6/2006 |
| JP | 2008-043040 | 2/2008 |
| JP | 2008-054439 | 3/2008 |
| JP | 2008-067418 | 3/2008 |

* cited by examiner

*Primary Examiner* — Ramy Ramadan
(74) *Attorney, Agent, or Firm* — Antonelli, Terry, Stout & Kraus, LLP.

(57) ABSTRACT

A charge/discharge control apparatus includes: a charge/discharge reward information receiving unit for receiving charge/discharge reward information representing a reward given to a charge/discharge action of a customer and a restriction in conducting a charging/discharging from a charge management central server; a computing unit for creating a charge/discharge plan including a total charging quantity in a time zone and an estimated use start time of an electric vehicle such that a reward is maximized, based on the charge/discharge reward information; a charge/discharge instruction transmitting unit for instructing the electric vehicle to start or finish a charging/discharging according to the charge/discharge plan; a charge/discharge quantity monitoring unit for monitoring the charging/discharging; and a charge/discharge results transmitting unit for transmitting results of monitored charging/discharging including contents of the conducted charging/discharging and individual identification information for identifying itself, to a charge management central server.

18 Claims, 14 Drawing Sheets

Charge/Discharge Reward Information

0401 Table

| | Time zone 0402 | | | | | | | | | |
|---|---|---|---|---|---|---|---|---|---|---|
| | ... | 4 | 5 | 6 | 7 | ... | 11 | 12 | 13 | 14 | ... |
| 0403 Charge reward rate [pt/kWh] | ... | 0.9 | 1.1 | 0.8 | 0.5 | ... | 0.1 | 0.0 | 0.0 | 0.0 | ... |
| 0404 Chargeable quantity [kWh/h] | ... | 6.0 | 5.5 | 5.0 | 5.0 | ... | 2.0 | 0.0 | 0.0 | 0.5 | ... |
| 0405 Discharge reward rate [pt/kWh] | ... | 0.0 | 0.0 | 0.1 | 0.1 | ... | 0.5 | 0.9 | 1.0 | 1.0 | ... |
| 0406 Dischargeable quantity [kWh/h] | ... | 0.0 | 0.0 | 0.0 | 2.0 | ... | 3.0 | 3.0 | 3.0 | 3.0 | ... |

Power Feeding Plan

CO2 Emission State

| | | Time zone 0702 | | | | | | |
|---|---|---|---|---|---|---|---|---|
| | | ... | t1 | t2 | t3 | t4 | t5 | t6 | ... |
| 0703 | Limit fuel cost [¥/kWh] | ... | 6.2 | 6.2 | 6.2 | 6.8 | 6.8 | 7.5 | ... |
| 0704 | Fuel type-based $CO_2$ coefficient [kg-$CO_2$/¥] | ... | 0.065 | 0.065 | 0.065 | 0.074 | 0.074 | 0.093 | ... |
| 0705 | Limit $CO_2$ emission quantity [kg-$CO_2$/kWh] | ... | 0.4 | 0.4 | 0.4 | 0.5 | 0.5 | 0.7 | ... |

FIG.8

Charge/Discharge History Information

0801 Table

| Day of the week | Four weeks ago | | Three weeks ago | | Two weeks ago | | One week ago | | This week | |
|---|---|---|---|---|---|---|---|---|---|---|
| | Charging quantity | Disconnection time | Charging quantity | Disconnection time | Charging quantity | Disconnection time | Charging quantity | Disconnection time | Charging quantity | Disconnection time |
| Mon. | 300 | 8:00 | 280 | 8:15 | 290 | 8:15 | 290 | 8:15 | 290 | 8:15 |
| Tue. | 200 | 7:45 | 100 | 8:00 | 150 | 8:00 | 150 | 8:15 | 150 | 8:00 |
| Wed. | 220 | 8:15 | 200 | 7:45 | 200 | 7:30 | 210 | 8:15 | *** | *** |
| ·· | 220 | 8:00 | 210 | 7:30 | 220 | 7:30 | 220 | 7:30 | — | |
| Sun. | 100 | 8:15 | 50 | 7:45 | 10 | 7:45 | 50 | 8:00 | — | |

0802

0805

0804 Dashed area

0803 Data

0806 Estimated disconnection time

Distribution System

CHARGE/DISCHARGE CONTROL APPARATUS

CROSS REFERENCE TO RELATED APPLICATIONS

This application claims the benefit of Japanese Patent Application No. 2008-246550 filed on Sep. 25, 2008, the disclosure of which is incorporated herein by reference.

BACKGROUND OF THE INVENTION

1. Field of the Invention

The present invention relates to a technique of indirectly controlling a start time or an end time of a charge/discharge and a quantity of the charge/discharge so as to achieve a charge/discharge plan of an electric storage installation using a secondary battery connected to a wide-area power system, in particular, so as to improve an energy consumption performance and a social environmental performance as a whole power system in terms of a number of storage batteries freely connected in parallel and disconnected by end users.

2. Description of the Related Art

Electric power installations using storage batteries, that is, electric storage installations have been recently expected to come into wide use from an environmental point of view. For example, such electric power installations include an electric vehicle electrically driven by a storage battery and a motor and an electric plug-in hybrid car using a combination of a gasoline engine and an electric motor. If a charging of the electric power installations is conducted at midnight, the charging favorably contributes to the environment.

A number of large-capacity power installations including storage batteries are timer-controlled. Electric water heaters or natural refrigerant heat pump water heaters used in ordinary households typically conduct a heat storage operation in a prescribed time zone dependent on an electric rate system. Similarly, a start time of a charging of a power installation as described above can be timer-controlled.

Further, such a control system can be built based not only on a state of a single unit of the power installation but also on an optimization of customers' or users' power consumption as a whole. Japanese Laid-Open Patent Application, Publication No. 2004-364463 discloses a technique of managing a priority ranking among a plurality of electric power installations of a customer and controlling power consumption of all customers for its optimization as a whole.

The control system can be built based not only a range of individual customers but also on an overall power system including power feeding such as a large-scaled power generator. Japanese Laid-Open Patent Application, Publication No. 2004-364463 also discloses a technique of conducting a charging plan for each charging battery in an attempt to contribute to the environment as a whole society, in which information on a recommended charge time zone and charge quantity (for example, information on a discount of electric rates given if a customer uses less power in summer which is a demand season) is obtained from a means of controlling an overall power system.

Of the conventional techniques described above, the technique using a timer control has, however, a problem of having a difficulty in dealing with a future increase in the number of installations using storage batteries. In particular, a widespread use of electric vehicles means that fossil fuel-dependent vehicles are incorporated into an electric power system. It is thus expected that a structure of power demand drastically changes both widely and locally. The environmental performance from a viewpoint of a whole society has become more and more important. The conventional technique using a timer control has a limitation in that optimization of the whole power installations is attempted by changing timer-controlled parameters via off-line operations on a case-by-case basis.

If an online-controlled optimization of the whole power installations is performed, a state of not a limited range of the power system but the whole power system is required to be reflected to the optimization in order to efficiently improve the environmental performance of the whole society. As disclosed in Japanese Laid-Open Patent Application, Publication No. 2004-364463, a charging plan for each charging battery should be created at least according to the information on a recommended charge time zone and charge quantity which is provided from a viewpoint of the whole power system.

Meanwhile, however, to encourage customers to participate in a charge/discharge management program for the purpose of increasing a social benefit, it is required that each of the customers can enjoy a merit according to his/her participation in the program.

Japanese Laid-Open Patent Application, Publication No. 2004-364463 does not have a means of managing charge actions by type of charging, based on the recommended information. This means that a customer just pays for a total of a power consumption due to a charging plus that for ordinary use. The related art cannot create a mechanism in which, for example, a power quantity used for a charging is distinguished from others and is subject to receive an incentive as a specific social program regarding a charging management of electric vehicles.

Japanese Laid-Open Patent Application, Publication No. 2004-364463 is required to send information on a charging request to an external facility in advance of an actual charge action if the recommended information is subject to be updated on a daily basis or the like. In reality, however, a user does not always conduct a charge/discharge action as originally planned because of an accidental event or the like. It is therefore difficult that all of the users send all of their charging requests to the external facility without fail.

Any of the related arts described above have a difficulty in offering a social program for leading a customer to a desired charge/discharge action. A customer will not participate in the mechanism of managing his/her charge action if the customer suffers inconvenience in conducting his/her charge/discharge action from the mechanism. For example, if a user is scheduled to drive an electric vehicle at a given time, a charging should be completed by the time of departure. Otherwise, such a charging gives inconvenience to the user. There is a need of a charging plan which satisfies a restriction condition for a user's power installation usage and suboptimally complies with the recommended information for the whole power system. Moreover, to achieve a wide spread of the social program, it is necessary to create a mechanism in which a customer can receive a reasonable amount of incentive for such a suboptimal charge action.

In light of the problems described above, the present invention has been made in an attempt to improve an energy consumption performance and a social environmental performance of a power system as a whole based on actions taken by customers of the power system.

SUMMARY OF THE INVENTION

A charge/discharge control apparatus for managing a charge/discharge plan of a rechargeable battery includes a means of periodically receiving charge/discharge reward information which quantitatively specifies a degree of contribution to society made by a charge/discharge action (a degree of positive or negative influence on society) for each time zone. The charge/discharge reward information is determined by an external facility, based on a supply-demand balance in a whole power system or a restriction of an installation capacity in a regional power transmission and distribution system and is broadcast to a wide area or by regions.

The charge/discharge control apparatus also includes a computing means (which may also be referred to as a computing unit) for creating a charge/discharge plan within a range acceptable for users (which may also be referred to as customers) which reflects a future utilization plan of a power installation in which the rechargeable battery is mounted, while based on the charge/discharge reward information. The future utilization plan includes an estimated usage start time and an estimated used power quantity and is received from outside or is estimated from a charge/discharge history or the like.

The charge/discharge control apparatus also includes a charge/discharge quantity monitoring means for determining whether or not a charge/discharge action has been actually conducted according to the created charge/discharge plan. Results of the determination are combined with a unique ID number stored in an individual identifier storage unit of the charge/discharge control apparatus and are transmitted to the external facility.

Those means enables to draw up a socially-suitable charge/discharge plan within a range not giving inconvenience to a user, while based on the charge/discharge reward information. For example, if a user is scheduled to drive an electric vehicle at a given time on the following day, a charging plan can be created within a range not negatively affecting the time of departure on the following day with at least a partial contribution to the environment.

As described above, the charge/discharge reward information is broadcast, even if a user does not conduct a charge/discharge action as originally planned because of an accidental event or the like. This enables at least a partial contribution to the environment.

Even such a partial contribution has an effect of encouraging a user to willingly participate in the program. The charge/discharge control apparatus can obtain a degree of contribution made by each user, from the external facility because the charge/discharge control apparatus has the means for monitoring or reporting whether or not a charge/discharge has been actually conducted. The charge/discharge control apparatus can reduce a flat electric power rate regarding a power usage amount used for a charging and provide various merits to the users.

Other features and advantages of the present invention will become more apparent from the following detailed description of the invention, when taken in conjunction with the accompanying exemplary drawings.

BRIEF DESCRIPTION OF THE DRAWINGS

FIG. 8 is an example of a table showing contents of charge/discharge history information memorized in a charge/discharge history memorizing unit according to the first embodiment.

DETAILED DESCRIPTION OF THE EXEMPLARY EMBODIMENTS

The exemplary embodiments of the present invention are described next in detail with reference to the related drawings according to the necessity.

<<First Embodiment>>

Figure 1:
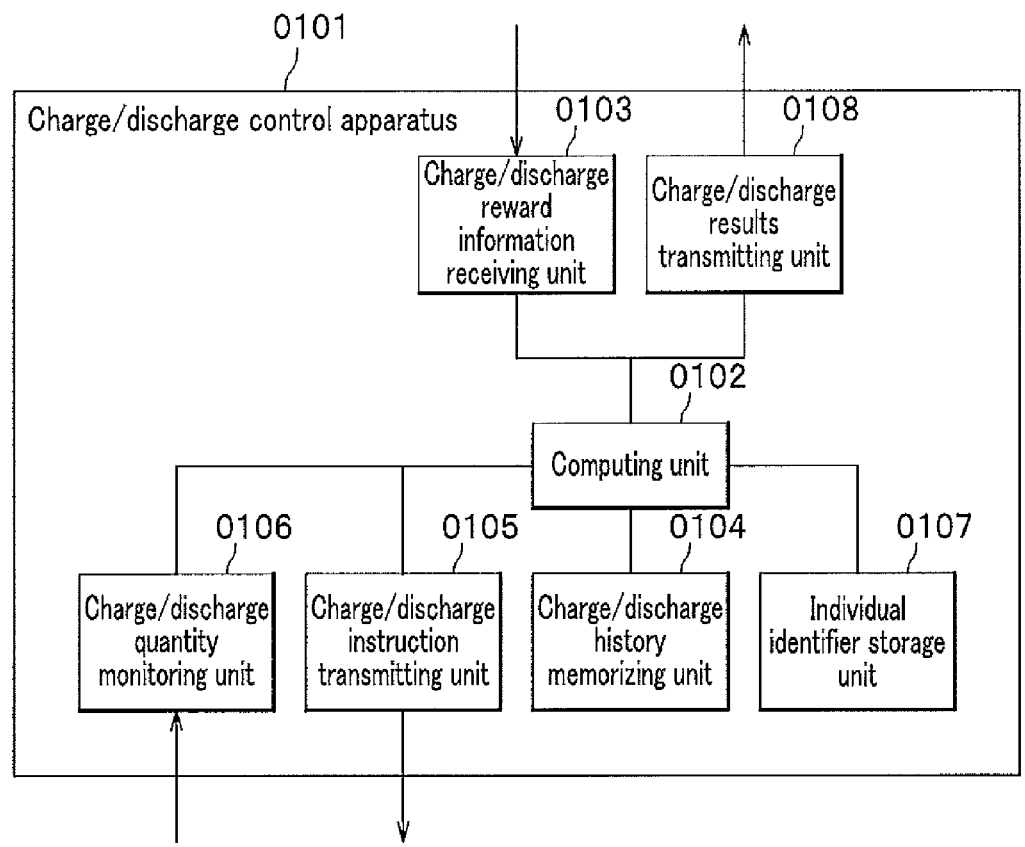
FIG. 1 is a block diagram illustrating a functional configuration of a charge/discharge control apparatus according to a first embodiment of the present invention.

FIG. 1 shows a functional configuration of a charge/discharge control apparatus according to a first embodiment. A charge/discharge control apparatus 0101 includes a computing unit 0102 and various input and output units for coordinating with an external facility. A charge/discharge reward information receiving unit 0103 receives charge/discharge reward information which quantitatively represents a degree of contribution to society made by a charge/discharge action (a degree of positive or negative influence on society) for each time zone, from a computer as the external facility. A memory unit not shown of the charge/discharge control apparatus 0101 memorizes the received charge/discharge reward information.

The computing unit 0102 estimates an estimated usage start time and an estimated used power quantity of a power installation targeted for use, based on the charge/discharge reward information as well as history information stored in a charge/discharge history memorizing unit 0104 and creates a charge/discharge plan. The memory unit in the charge/discharge control apparatus 0101 stores the created charge/discharge plan.

A charge/discharge instruction transmitting unit 0105 gives a command of a start or an end of a charge or a discharge (which means a return of electric power to a commercial power system 0213, to be described later) of a storage battery in the power installation based on the charge/discharge plan.

A charge/discharge quantity monitoring unit 0106 determining whether or not a customer of a power installation has taken a charge/discharge action so as to separately review whether or not the charge/discharge is actually completed.

A charge/discharge results transmitting unit 0108 transmits results of the determination combined with an ID number unique to a charge/discharge control apparatus stored in an individual identifier storage unit 0107 as charge/discharge results, to the external facility. The charge/discharge results are created by the charge/discharge quantity monitoring unit 0106 and are stored in the memory unit of the charge/discharge control apparatus 0101.

Figure 2:
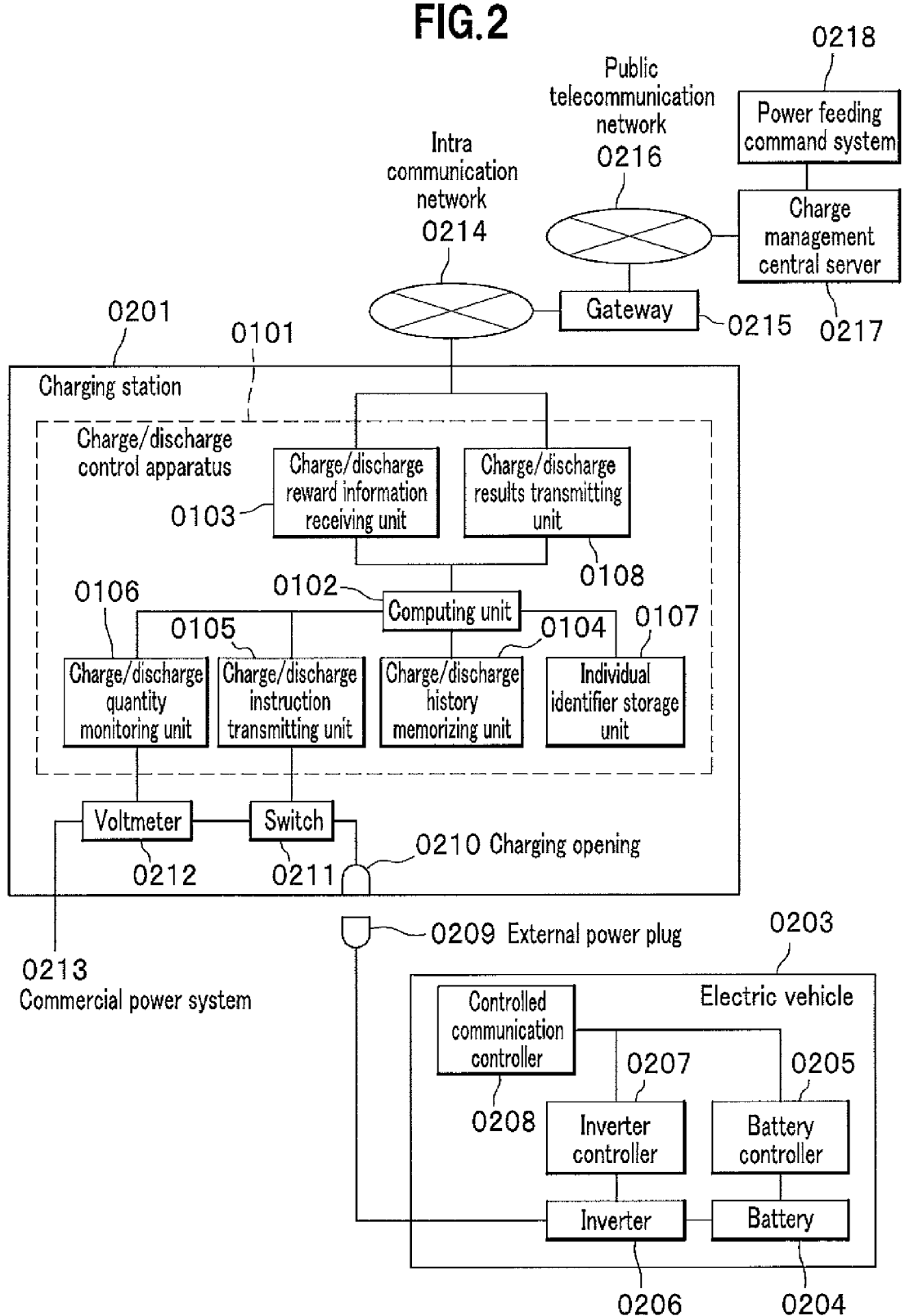
FIG. 2 is a block diagram illustrating a functional configuration of a charge station including the charge/discharge control apparatus and relevant systems according to the first embodiment.

The first embodiment describes a social program for managing a charge/discharge action of an electric vehicle (which may also be referred to as a charging type mobile vehicle) by incorporating a charge/discharge control apparatus of the present invention into a ground-based charging station (charging installation). The charging station is assumed to be installed in ordinary households. An electric vehicle hooked up to such a charging station is typically used in a limited environment and is supposed to be readily identifiable. FIG. 2 shows a functional configuration of a charge station with the charge/discharge control apparatus mounted therein and relevant systems.

The charge station 0201 has the charge/discharge control apparatus 0101 mounted therein as described in FIG. 1. The charge station 0201 is connected to an externally-provided electric vehicle 0203. The electric vehicle 0203 includes a battery 0204, a battery controller 0205, an inverter 0206, an inverter controller 0207, and a controlled communication controller 0208. Whether or not the battery 0204 conducts a charge/discharge, and, if conducted, a charge/discharge quantity is controlled based on information transferred via the controlled communication controller 0208. The electric vehicle 0203 is designed to be connected to a charging opening 0210 of the charge station 0201 using an external power plug (which may also be referred to as a charging plug) 0209.

In the charge station 0201, a power line connected to the charging opening 0210 is connected to the commercial power system 0213 via a switch 0211 and a voltmeter 0212. A charge/discharge of the electric vehicle 0203 is possible only when the switch 0211 is turned on (put in an open state). In the charge station 0201, whether or not the switch 0211 is turned on is determined according to a control signal generated by the charge/discharge instruction transmitting unit 0105 of the charge/discharge control apparatus 0101.

Descriptions of an intra communication network 0214, a gateway 0215, a public telecommunication network 0216, a charge management central server 0217, and a power feeding command system 0218 will be made later.

Figure 3:
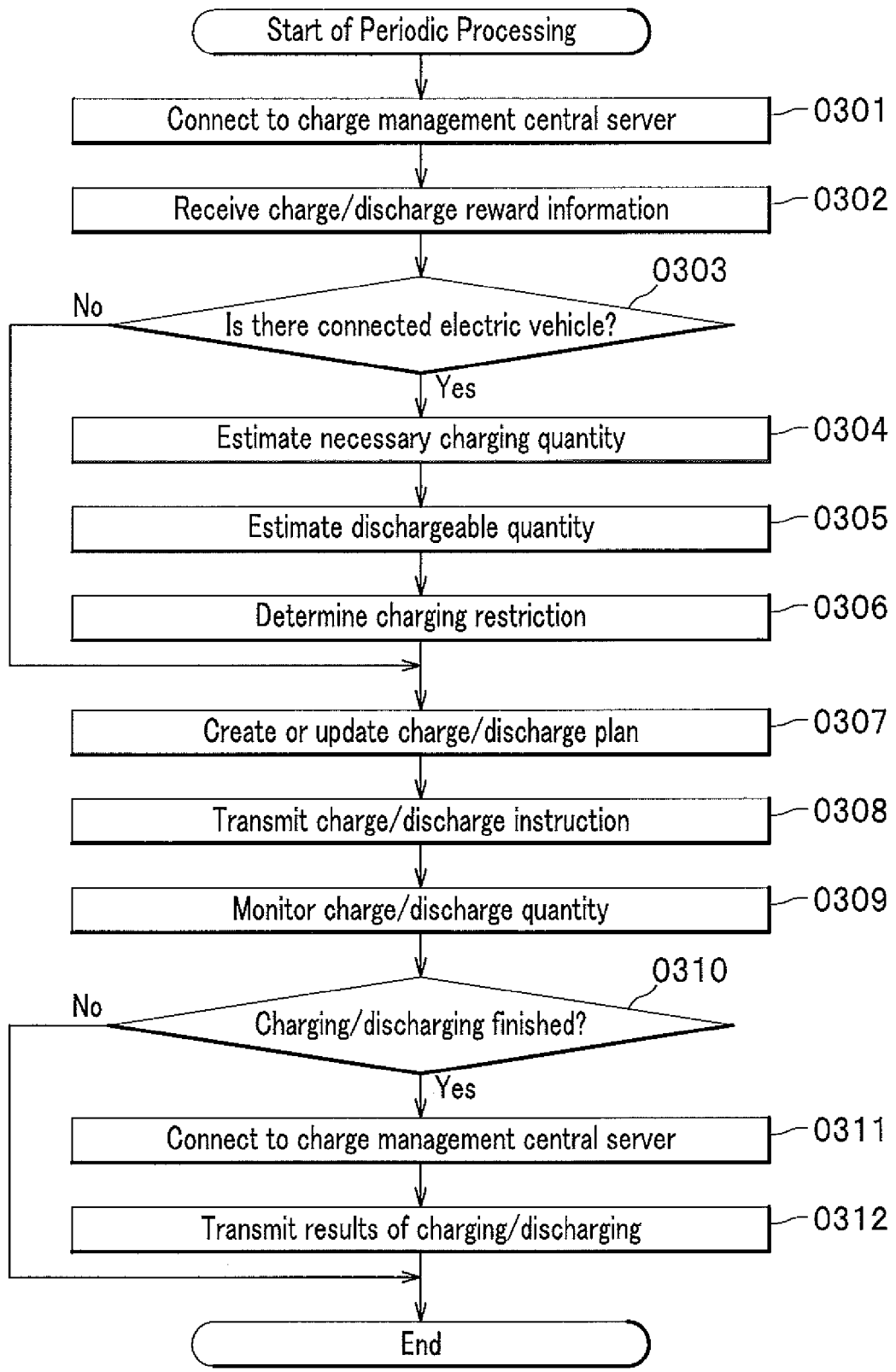
FIG. 3 is a flowchart showing a processing in a computing unit of the charge/discharge control apparatus according to the first embodiment.

Next is described a processing including steps of creating a charge/discharge plan, transmitting a charge/discharge command, and transmitting results of the charge/discharge, which is performed by the computing unit 0102 of the charge/discharge control apparatus 0101, as shown in FIG. 3. In the computing unit 0102, a periodic processing with activation at fixed intervals (a processing at fixed intervals) is performed. For example, the processing is set to be performed at a 30-minute interval.

In step 0301, the charge/discharge control apparatus 0101 is connected to the externally-provided charge management central server 0217. The charge/discharge reward information receiving unit 0103 has an authority to connect the charge/discharge control apparatus 0101 to the charge management central server 0217 via the intra communication network 0214, gateway 0215, and public telecommunication network 0216. In step 0302, upon completion of the connection, the charge/discharge reward information receiving unit 0103 receives charge/discharge reward information from the charge management central server 0217. The computing unit 0102 processes the received charge/discharge reward information.

Figures 4, 5:
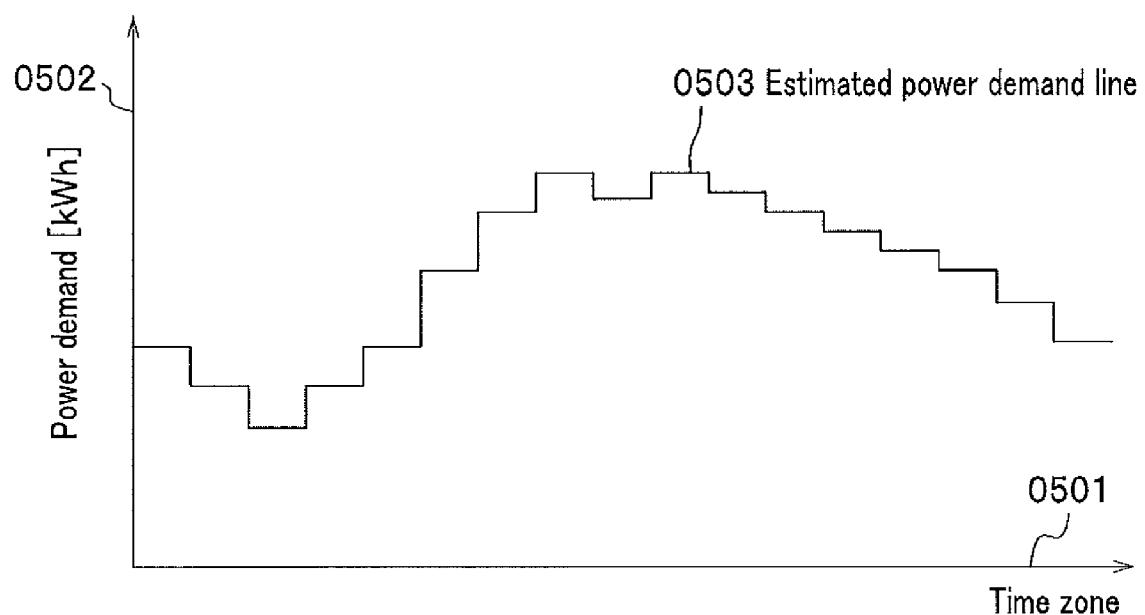
FIG. 4 is an example of a table showing contents of charge/discharge reward information according to the first embodiment.
FIG. 5 is an example of a graph showing an estimated power demand according to the first embodiment.

A table 0401 of FIG. 4 shows contents of the charge/discharge reward information. The table 0401 includes a charge reward rate 0403 for each time zone 0402 which is divided up by the hour. The charge reward rate 0403 indicates a quantity of a reward [pt] to be rewarded if a charging at a unit quantity [kWh] is conducted for each time zone 0402. The reward is given in a virtual value represented by its unique unit system and is guaranteed to be redeemable for various services. The table 0401 also includes a chargeable quantity 0404 which indicates a restriction condition of a chargeable quantity [kWh] for each time zone 0402. Similarly, the table 0401 includes a discharge reward rate 0405 and a dischargeable quantity 0406. The reward is thus provided on a prescribed time basis for a prescribed time period.

The charge management central server 0217 generates numeric values constituting the charge/discharge reward information. The charge management central server 0217 in cooperation with the power feeding command system 0218 determines the charge/discharge reward information based on a power generation condition of a whole power system. The power feeding command system 0218 performs a processing of estimating a future power demand. For example, as shown in a graph of FIG. 5, the power feeding command system 0218 computes an estimated power demand line 0503 for 24 hours on the following day. The graph has a time zone (hourly) 0501 as a horizontal axis and a power demand 0502 of the whole power system as a vertical axis. The processing of estimating a future power demand utilizes generally-known technologies such as a multiple regression analysis focusing on temperature and humidity and a forecasting method using a neural network.

The power feeding command system 0218 creates a start-and-stop plan of a power generator and computes an economical load dispatching, based on the estimated power demand. The start-and-stop plan of a power generator is created using generally-known technologies such as a combination of the Lagrangian relaxation method and the dynamic programming, and an optimization calculation using various metaheuristic techniques. To minimize cost of fuel and starts and stops of a power generator, a suboptimum start-and-stop plan of the power generator is created based on a restriction on supply-demand balance as well as a restriction on reserved capacity of power feeding and on LNG (Liquefied Natural Gas) consumption. Herein, the LNG is a fuel used in a thermal power plant. Similarly, the economical load dispatching is computed using generally-known technologies such as the equal λ method (equal incremental cost loading method), thus determining a power generating quantity assigned to each power generator to be started so as to minimize the fuel cost.

Figures 6, 7:
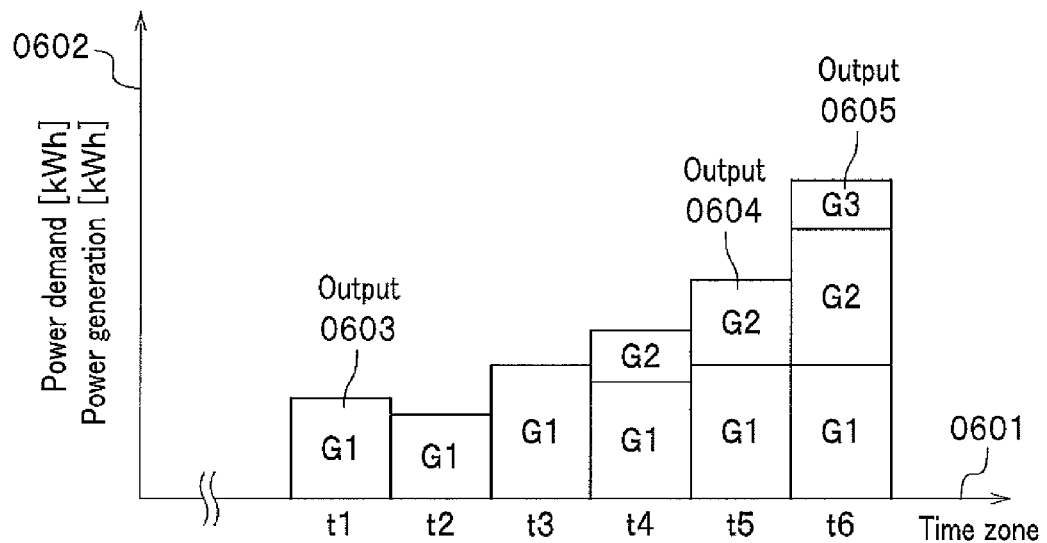
FIG. 6 is an example of a graph showing a power feeding plan according to the first embodiment.
FIG. 7 is an example of a table showing a $CO_2$ emission state reflecting the power feeding plan according to the first embodiment.

As a result, the power feeding command system 0218 creates a power feeding plan as shown in FIG. 6 having a time zone 0601 as a horizontal axis and a power generating quantity corresponding to the estimated power demand 0602 as a vertical axis. In FIG. 6, for example, for time periods from a time zone t1 to a time zone t3, an output 0603 by a power generator G1 alone achieves a supply demand balance. For time periods from a time zone t4 to a time zone t5, a power output 0604 by a power generator G2 is added to the output 0603 by the power generator G1. In time zone t6, a power output 0605 by a power generator G3 is further added to the former.

As described above, the charge management central server 0217 determines the charge/discharge reward information based on the power feeding plan created by the power feeding command system 0218. In the determination, the charge management central server 0217 creates a table of FIG. 7 and uses a limit $CO_2$ emission quantity (a limit greenhouse effect gas emission quantity). A table 0701 of FIG. 7 shows a $CO_2$ emission state as a basis for calculating the charge/discharge reward information. A limit fuel cost [¥/kWh] 0703 for each time zone 0702 is extracted according to the power feeding plan. For example, from the time zone t1 to time zone t3, the limit fuel cost is derived from a limit fuel cost of the power generator G1 is adopted. The limit fuel cost is multiplied by a fuel type-based$CO_2$ coefficient [kg-$CO_2$/¥] 0704 which varies according to a fuel type of each power generator, to thereby calculate a limit $CO_2$ emission quantity [kg-$CO_2$/kWh] 0705. The limit $CO_2$ emission quantity represents an impact on a $CO_2$ emission quantity when a unit quantity of a power demand is increased or decreased for each time zone.

Based on the limit $CO_2$ emission quantity, a provider that manages the charge management central server 0217 determines a point earning rate of the discharge reward rate 0405 with reference to a limit $CO_2$ emission quantity 0705 in a corresponding time zone. If a discharging is conducted in a time zone in which the limit $CO_2$ emission quantity 0705 is large, for example, in the daytime, a $CO_2$ emission by the discharging in the time zone is regarded as a contribution. Similarly, the provider determines a point earning rate of the charge reward rate 0403 with reference to a value obtained by dividing the limit $CO_2$ emission quantity 0705 in a time zone in the daytime by an average value of the limit $CO_2$ emission quantities 0705 in the time zones in the daytime.

Further, if a charging is conducted in a time zone in which the limit $CO_2$ emission quantity 0705 is small, for example, in the night, the charging is regarded as a contribution because an increase in $CO_2$ emission by conducting a charging in a time zone in the daytime has been avoided. The chargeable quantity 0404 and the dischargeable quantity 0406 can be calculated by dividing a reserved capacity for an output increase or decrease of a power generator by the statistically expected number of units of existing charge/discharge apparatuses.

In this embodiment, the charge/discharge reward information is determined based on the power feeding plan as described above. However, the charge/discharge reward information may be determined based on other factors such as a capacity limit of a power transmission and distribution installation, as described later. Further, a provider for managing the charge management central server 0217 may offer various political incentives such as biased reward rates (0403, 0405) by regions.

In step 0303, it is determined whether or not there is an electric vehicle (EV) having been newly connected to the charging opening 0210 of the charge station 0201. If there is an electric vehicle 0203 having been newly connected thereto, the voltmeter 0212 detects passage of a certain amount of electric current. Thus, if the passage is detected, it is determined that the electric vehicle 0203 having been newly connected. Upon the determination, the switch 0211 is released (put in a closed state) so as to stop the charging to the electric vehicle 0203. The switch 0211 is typically kept released until the charge/discharge instruction transmitting unit 0105 instructs to resume the charging.

If it is determined that there is an electric vehicle 0203 having been newly connected in step 0303 (if Yes in step 0303), in step 0304, a necessary charging quantity is estimated. As shown in a table 0801 of FIG. 8, the charge/discharge history memorizing unit 0104 stores therein a charging quantity having been charged before in the charge station 0201 as charge/discharge history information. In the table 0801, the charge/discharge history information is managed according to the day of the week. For example, the charge/discharge history information includes a charging quantity 0802 having been charged on Monday four weeks ago. A charging quantity necessary for a newly connected electric vehicle 0203 is estimated based on the history information as described above. Herein, respective data on the same day of the week in the previous four weeks are extracted and are averaged. The averaged value is adopted as the necessary charging quantity. For example, if a necessary charging quantity of the following day (Wednesday) corresponding to a data 0803 is estimated, charging quantities within a dashed area 0804 are averaged. Note that the history information may include a discharging quantity according to the day of the week. The history information may be managed not according to the day of the week but by the day.

In step 0305, the dischargeable quantity 0406 is estimated using the history information. The dischargeable quantity 0406 is obtained by assuming that the largest ever charging quantity is a storage battery capacity and subtracting a chargeable quantity from the assumed storage battery capacity. In step 0306, a start time of using the electric vehicle 0203 is estimated based on the history information. The estimated vehicle use start time is determined as a charging restriction. In this embodiment, the switch 0211 of the charge station 0201 is continued to be turned on, even after the charging is conducted. This allows even a small quantity of power consumption other than that used for charging the electric vehicle 0203 to be continuously measured. If the measured value falls to zero, it is determined that the electric vehicle 0203 is disconnected from the charging opening 0210 (that is, a power installation or the like is separated from a power system) The history information also includes the vehicle use start time as a disconnection time 0805. For example, in a manner similar to step 0304 for estimating the necessary charging quantity, an estimated disconnection time 0806 on the following day is calculated as an estimated vehicle use start time, by averaging the disconnection times 0805 within the dashed area 0804.

On the other hand, if it is not determined that the electric vehicle 0203 has been newly connected in step 0303 (if No in step 0303), the processing advances to step 0307 without estimating the necessary charging quantity, dischargeable quantity, and vehicle use start time in steps 0304 to 0306.

Figure 9:
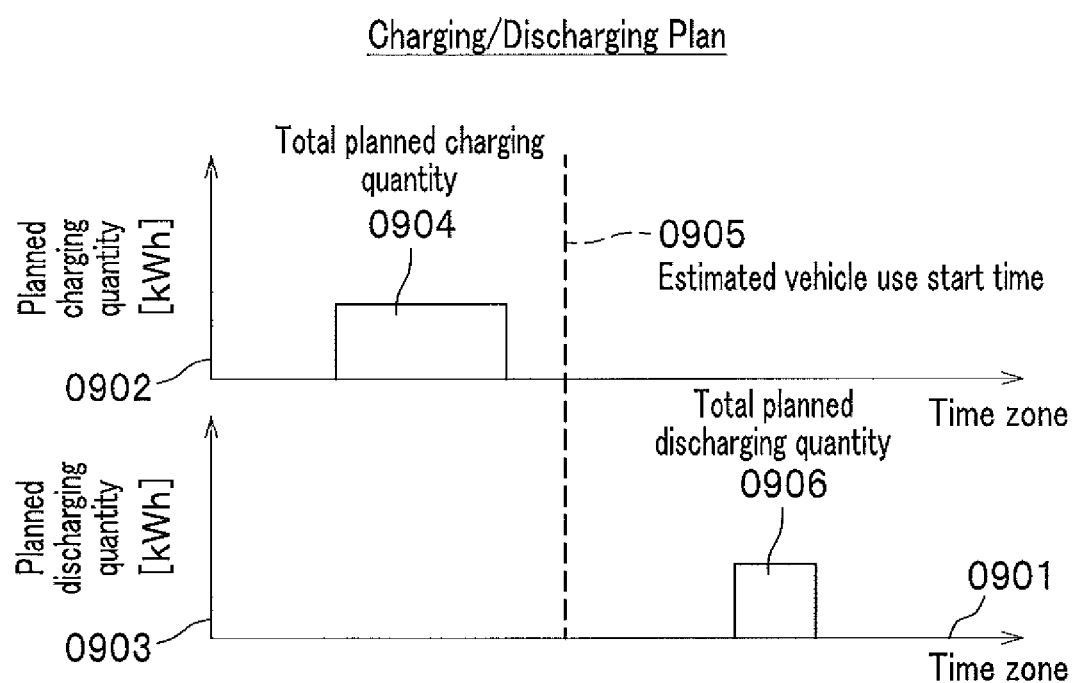
FIG. 9 is a diagram illustrating contents of a charge/discharge plan according to the first embodiment.

In step 0307, a charge/discharge plan is created. If the plan has already been created, the plan is updated. FIG. 9 shows contents of the charge/discharge plan. In FIG. 9, the contents are represented by time series data with a time zone 0901 each as a horizontal axis and a planned charging quantity 0902 [kWh] and a planned discharging quantity 0903 [kWh] as respective vertical axes.

Of the charge/discharge plan, a charging plan is created such that a total planned charging quantity 0904 meets a necessary charging quantity and that a point rewarded for a charge is maximized. Further, the following restriction conditions are set: 1) A charging is to be conducted in a single time zone or consecutive time zones; 2) A capacity of a charging facility or a chargeable quantity specified by the charge/discharge reward information restricts a planned charging quantity per unit time; and 3) A charging does not contradict an estimated use start time 0905 (that is, a charging is to be conducted before the estimated use start time 0905). The above problem having the restriction conditions can be formulated as an integer mixed problem with a vehicle use start time and a vehicle use finish time as variables. Thus, the problem can be solved using commonly-used search techniques such as a tab search. Basically, a time zone for conducting a charging (charging time zone) is determined focusing around a time zone having the highest charge reward rate 0403.

In step 0307, a discharging plan is also created including a total planned discharging quantity 0906. If the electric vehicle 0203 is connected to the charge station 0201 (that is, the electric vehicle 0203 is not in use) in a time zone in which the discharge reward rate 0405 is significantly high, for example, in the daytime, this means that a discharging is being conducted in accordance with the discharging plan. On the other hand, if the electric vehicle 0203 is in use, this means that the discharging plan is not implemented. A quantity of the discharging is regarded as an increase in a necessary charging quantity which requires a re-charging on the following day. Then, an increase in a power usage quantity is estimated from statistical data corresponding thereto. The increase in a power usage quantity is compared to a value obtained by converting a point to be earned according to the discharge reward rate 0405 with a predetermined coefficient. The comparison makes it possible to make a determination whether or not the discharging is advantageous. Consecutive time zones in which a discharging is determined to be advantageous (discharging time zones) are extracted, to thereby determine the total planned discharging quantity 0906. A condition is set that the total planned discharging quantity 0906 does not contradict the estimated use start time 0905 (that is, the discharging is to be conducted after the estimated use start time 0905). The determined total planned discharging quantity 0906 is introduced as the discharging plan.

In step 0308, a charge/discharge instruction is transmitted. The charge/discharge instruction transmitting unit 0105 outputs a control signal such that a charge/discharge is controlled with reference to the charge/discharge plan so as conduct an appropriate charge/discharge in appropriate time zones. In this embodiment, the charge/discharge instruction transmitting unit 0105 instructs the switch 0211 to be turned on in a time zone after a charging start time set in the charging plan. Meanwhile, this embodiment does not include a means of reflecting the discharging plan in conducting a charge/discharge. The processing that follows thus advances without reflecting the discharging plan. How to reflect the discharging plan will be described later in another embodiment.

In step 0309, a charge/discharge quantity is monitored. The charge/discharge quantity monitoring unit 0106 measures a power quantity passing the voltmeter 0212. In this embodiment, the measured power quantity corresponds to a power quantity received from the commercial power system 0213, which is then consumed in charging the electric vehicle 0203. The charge/discharge quantity monitoring unit 0106 determines that a charging is being conducted, if the charge/discharge quantity monitoring unit 0106 confirms a constant and not-very-small quantity of a power is being consumed without interruption. In some cases, a charging is finished under control of the inverter controller 0207 equipped in the electric vehicle 0203. In other cases, a charging is forcibly stopped when a user of the electric vehicle 0203 manually unplugs the power source in the electric vehicle 0203. In any case, the charge station 0201 cannot explicitly recognize that the charging has finished.

In step 0310, the charge/discharge quantity monitoring unit 0106 determines whether or not the charging/discharging has been finished by detecting that a charge/discharge power quantity continued for a prescribed period of time has fallen to a very small quantity or zero. If it is determined that the charge/discharge has been finished (if Yes in step 0310), in step 0311, the charge/discharge results transmitting unit 0108 is connected to the charge management central server 0217. In step 0312, the charge/discharge results transmitting unit 0108 transmits results of the charging/discharging to the charge management central server 0217.

Figure 10:
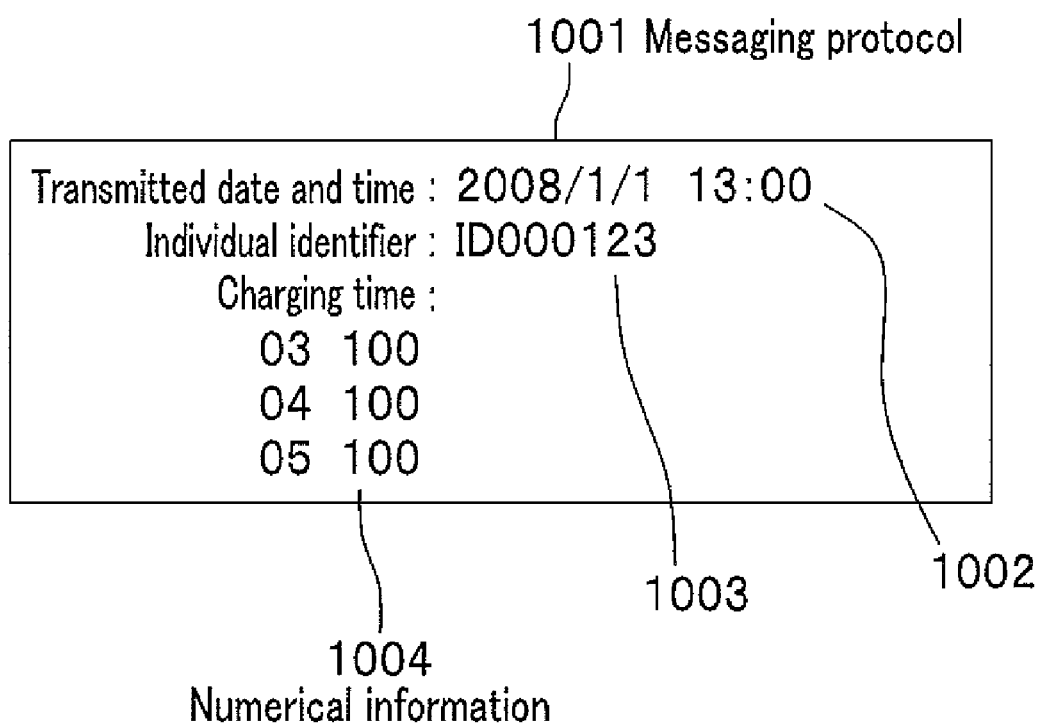
FIG. 10 is a diagram illustrating contents of results of charging/discharging according to the first embodiment.

The results of the charging/discharging include contents as shown in FIG. 10. A messaging protocol 1001 includes: a transmitted date and time 1002 transmitted from the charge/discharge control apparatus 0101; an individual identifier 1003 (which may also be referred to as information on individual identifier) stored in the individual identifier storage unit 0107; and numerical information 1004 for each time zone which are charging quantities measured by the charge/discharge quantity monitoring unit 0106. The contents may be encrypted according to a security level of a communications line used.

The charge/discharge history information stored in the charge/discharge history memorizing unit 0104 is obtained by extracting a value contained in the results of charging/discharging, arranging the value in a prescribed format (for example, in a tabular form shown in FIG. 8), and storing the arranged data. The charge/discharge history information is created by, for example, the computing unit 0102.

If it is not determined that the charge/discharge has been finished (if No in step 0310), the processing terminates without conducting step 0311 and step 0312.

If the processing at fixed intervals shown in FIG. 3 as described above is performed repeatedly, a desirable charge action for the electric vehicle 0203 connected to the charge station 0201 is encouraged, which contributes to a power feeding plan for an overall commercial power system.

The externally-provided charge management central server 0217 receives the charging/discharging results and computes a reward point corresponding to a charge/discharge quantity included in the results. The charge management central server 0217 makes a means not shown report the computed points to the user of the charge station 0201. The points are redeemable in various monetary or non-monetary forms such as a refund, a right to enjoy a service related to power consumption, and a certificate for certifying a contribution to the environment or society.

The charge management central server 0217 processes only a value actually confirmed by the charge/discharge quantity monitoring unit 0106, without any reference to the charge/discharge plan created in the charge/discharge control apparatus 0101. This can prevent a user from participating only in creating a charge/discharge plan but not actually conducting a charge/discharge. Further, this serves as an incentive for a user to participate in a scheme of the charge/discharge management according to this embodiment even for a short period of time whenever possible.

<<Second Embodiment>>

Figure 11:
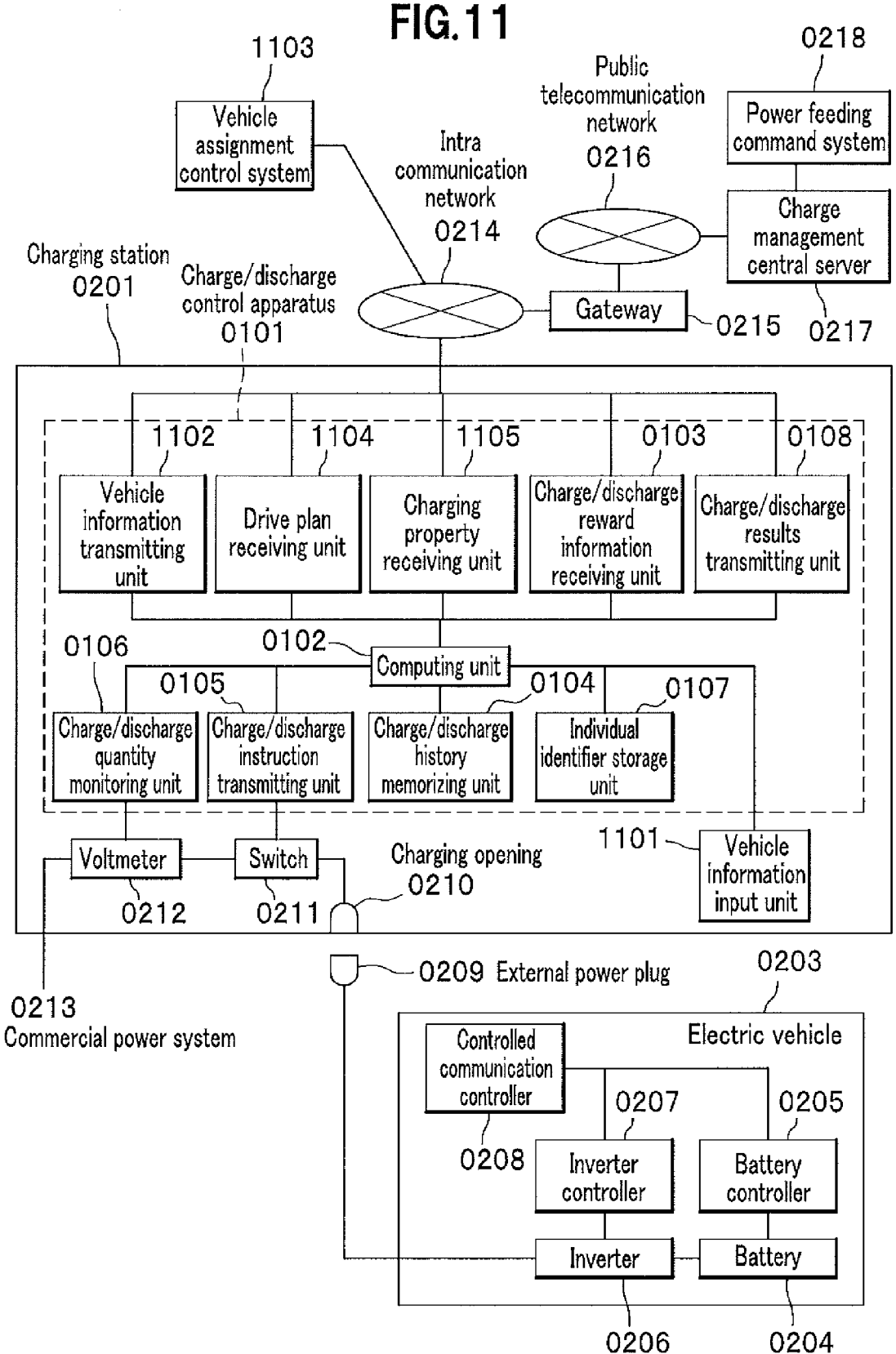
FIG. 11 is a block diagram illustrating a functional configuration of a charge station with a charge/discharge control apparatus mounted therein and relevant systems according to a second embodiment.

A second embodiment describes a system in which a charge/discharge apparatus of the present invention is mounted in a charge ground-based charging station, and the charge/discharge apparatus cooperates with a dispatch control system which is a server used by an operator of managing electrical vehicles for business use, to thereby manage a charge/discharge action of the electric vehicles for business use. In the system, it is assumed that a number of electric vehicles for business use are present and that any of the electric vehicles can be connected to the charging station. FIG. 11 shows a configuration of the system. The configuration and processing in the second embodiment are similar to those in the first embodiment. Next is described the second embodiment focusing on operations different from those in the first embodiment.

Figure 12:
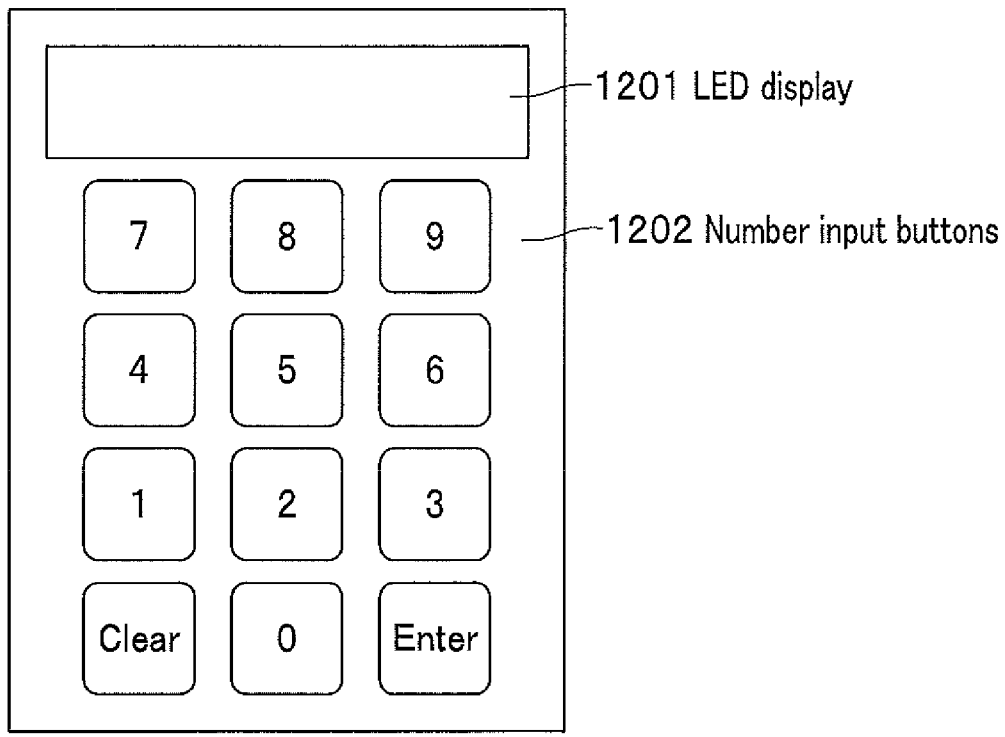
FIG. 12 is an appearance diagram illustrating an HMI device according to the second embodiment.

The charge station 0201 includes a vehicle information input unit 1101 for inputting an ID number for identifying the electric vehicle 0203. The vehicle information input unit 1101 is embodied by, for example, an HMI (Human Machine Interface) device attached to a front panel of the charge station 0201 as shown in FIG. 12. The HMI device has an LED display 1201 and number input buttons 1202, with which a user of the charge station 0201 enters appropriate numbers of an ID of the electric vehicle 0203 to be connected. Vehicle information specified by the entry (which may also be referred to as vehicle identifying information) is used in steps 0304 to 0306 for determining the connection of an electric vehicle in step 0303.

Figure 13:
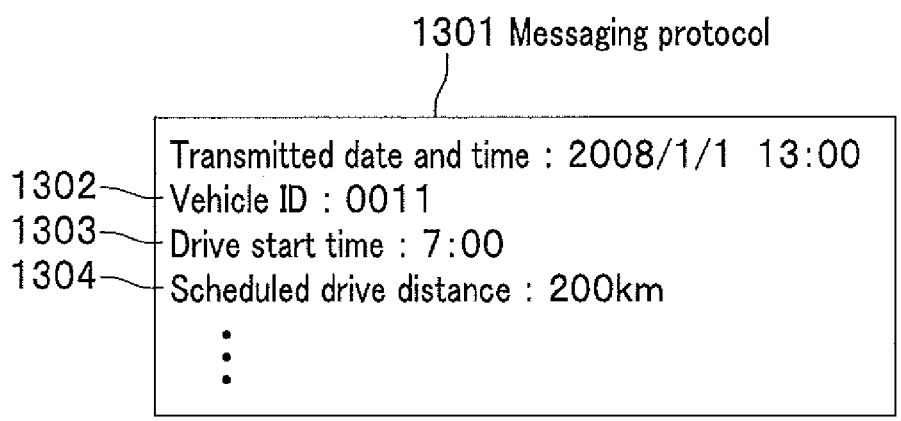
FIG. 13 is a diagram illustrating contents of a drive plan according to the second embodiment.

The vehicle information transmitting unit 1102 transmits the specified vehicle information as a vehicle ID of the electric vehicle to be charged, to a vehicle assignment control system 1103 connected to an intra communication network 0214. The vehicle assignment control system 1103 creates a drive plan of the specified vehicle with reference to a delivery schedule on the following day which is managed by the vehicle assignment control system 1103 itself. The vehicle assignment control system 1103 transmits the created drive plan to the charge station 0201. As shown in FIG. 13, the drive plan transmitted from the vehicle assignment control system 1103 has a messaging protocol 1301 including a vehicle ID 1302, a drive start time 1303, and a scheduled drive distance 1304. The messaging protocol 1301 is received by the drive plan receiving unit 1104 of the charge/discharge control apparatus 0101 and is used as information on a necessary charging quantity, a dischargeable quantity, and a restriction condition of a charging/discharging. Exchange of the information allows a charge/discharge plan to be created with high accuracy according to respective drive plans of the electric vehicles 0203 for business use.

A charging property of each electric vehicle 0203 for business use can be taken into account in creating the charge/discharge plan. A charging property receiving unit 1105 receives a restriction condition possibly depending on different batteries in different electric vehicles 0203, such as a restriction regarding a charging depth and a change in a charging quantity as time elapses, from a vehicle assignment control system 1103. If a charge/discharge plan is created in step 0307 taking such a restriction condition into account, a charging capable of preventing a battery from degrading can be realized by solving an optimization problem with the restriction condition.

<<Third Embodiment>>

Figure 14:
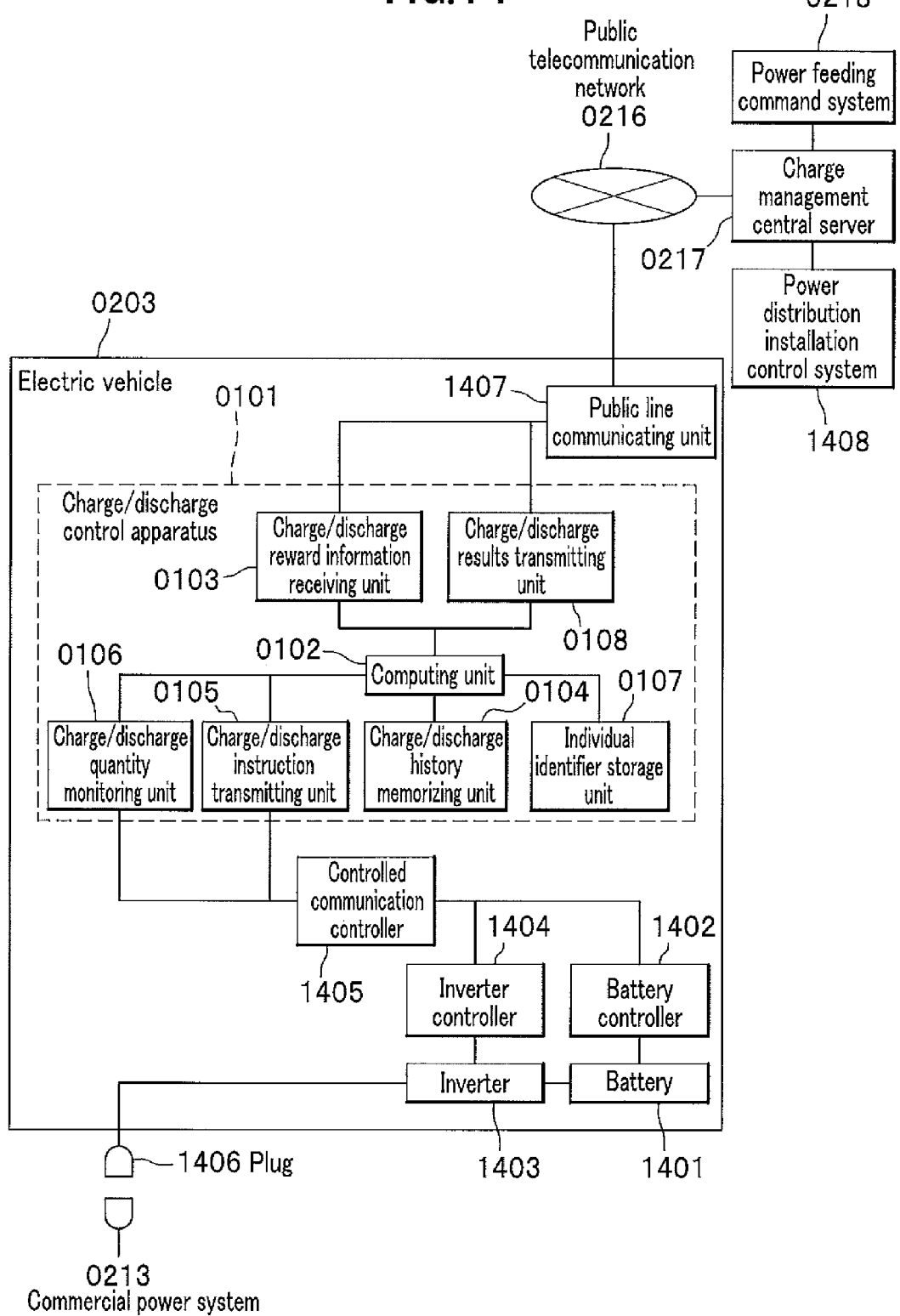
FIG. 14 is a block diagram illustrating a functional configuration of a charge station with a charge/discharge control apparatus mounted therein and relevant systems according to a third embodiment.

A third embodiment describes a system in which a charge/discharge apparatus of the present invention is mounted in an electric vehicle, and the charge/discharge apparatus manages a charge/discharge action of the electric vehicle. Further, the system in this embodiment has a configuration in which a charging is managed according to circumstances by region by cooperating with a power distribution installation control system or the like, if the electric vehicle freely travels over a wide region. FIG. 14 shows a functional configuration of the system. The configuration and processing in the third embodiment are similar to those in the first embodiment. Next is described the third embodiment focusing on operations different from those in the first embodiment.

In this embodiment, a set of power conversion devices for use in conducting a charging/discharging is mounted in the electric vehicle 0203. More specifically, the electric vehicle 0203 is equipped with: a battery 1401; a battery controller 1402 of the battery 1401; an inverter 1403; an inverter controller 1404 of the controller 1403; and a controlled communication controller 1405 for coordinating the controllers 1402, 1404 via a control system network. Therefore, the electric vehicle 0203 is capable of conducting a charging/discharging by directly connecting a plug 1406 thereof to the commercial power system 0213. A charging mechanism is herein constituted by the battery 1401, battery controller 1402, inverter 1403, inverter controller 1404, and controlled communication controller 1405.

The controlled communication controller 1405 connects the control system network for providing various controls in the electric vehicle 0203 to an information system network for dealing with external information. The controlled communication controller 1405 herein serves as a gateway. Information related to the charge/discharge quantity monitoring unit 0106 and the charge/discharge instruction transmitting unit 0105 is designed to be exchanged in the control system network in the electric vehicle 0203. It is thus possible to receive information on a monitored charging depth from the battery 1401 and output a charge/discharge instruction to the inverter 1403. This allows a charging/discharging of the electric vehicle 0203 to be flexibly controlled according to the charge/discharge plan created in the charge/discharge control apparatus 0101 in step 0307.

The charge/discharge control apparatus 0101 is further connected to an in-vehicle public line communicating unit 1407 and is capable of communicating information with the outside. The charge/discharge control apparatus 0101 can coordinate with the charge management central server 0217 by communicating information via the public line communicating unit 1407.

The public line communicating unit 1407 (which may also be referred to a positioning device) also has a positioning function and detects a current position of the electric vehicle 0203 as positioning information. The public line communicating unit 1407 transmits the positioning information to the charge management central server 0217. This enables a determination whether or not the current position is within a business area covered by an operator who operates the server 0217. A user who conducts a charging/discharging outside of the business area is not entitled to receive a reward as described above. More specifically, the charge/discharge reward information (see FIG. 4) created by the charge management central server 0217 herein includes the charge reward rate 0403, chargeable quantity 0404, discharge reward rate 0405, and dischargeable quantity 0406 not only by the time zone but also by the region. For example, the charge reward rate 0403 outside of the coverage area is set at zero in any time zone. The computing unit 0102 creates a charge/discharge plan based on the charge/discharge reward information.

Figure 15:
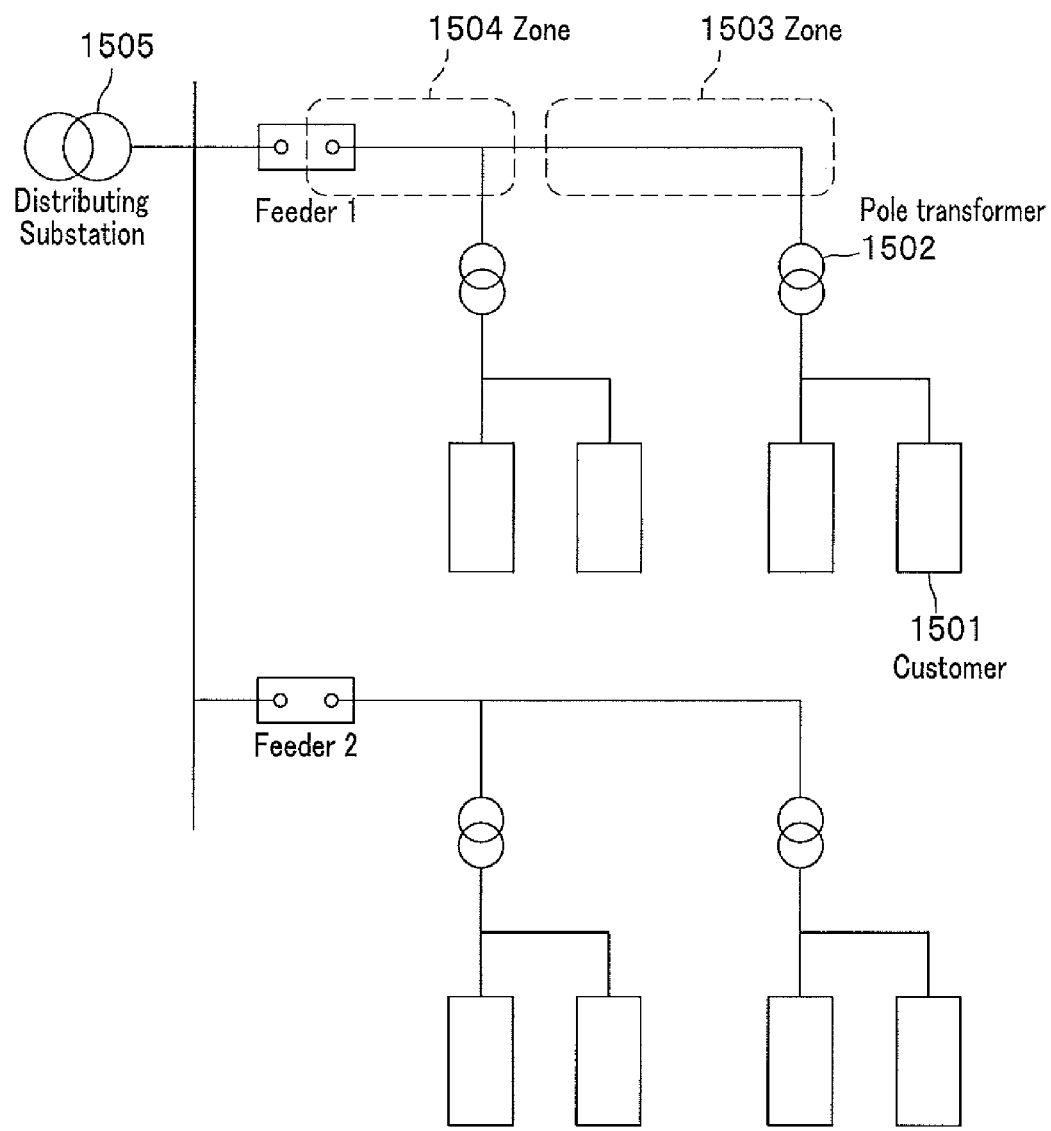
FIG. 15 is an example of a configuration of a power distribution system according to the third embodiment.

The charge/discharge control apparatus 0101 encourages a charge/discharge action suited to a condition of a power distribution installation by coordinating with the power distribution installation control system 1408. FIG. 15 shows an example of a configuration of a power distribution system. For example, assume a case where a customer 1501 whose electric vehicle 0203 is connected to a low-voltage distribution system conducts a charging of the electric vehicle 0203 from the commercial power system 0213. A capacity of a pole transformer 1502 is a restriction of the charging. If a number of customers whose electric vehicles 0203 are connected to the same low-voltage distribution system conduct a charging all together, there is a possibility that the pole transformer 1502 exceeds its capacity limit, that is, the pole transformer 1502 runs short of its capacity.

To avoid such a capacity shortage, the power distribution installation control system 1408 manages, as advance information, directions of customers, and a location and a capacity of the pole transformer 1502 as a power distribution installation. Based on the managed information, the power distribution installation control system 1408 controls the chargeable quantity 0404 in the charge/discharge reward information (see the table 0401 of FIG. 4) determined by the charge management central server 0217, on the charge/discharge control apparatuses 0101 registered in the same region. Additionally, the charge management central server 0217 transmits the charge reward rate 0403 which has been changed according to the necessity. The changed charge reward rate 0403 is transmitted only to a customer whose individual identifier has been transmitted to the charge/discharge control apparatus 0101. Upon receipt of the identifier, the charge management central server 0217 transmits the changed charge reward rate 0403 to the customer with a destination thereof changed to another charge/discharge control apparatus 0101. Thus, a coincident charging of a number of electric vehicles 0203 by neighboring customers in the same region can be avoided, which may otherwise result in the capacity shortage.

Besides a capacity of the pole transformer 1502, there is a possibility that a charge action is also restricted by a capacity of power distribution line in a zone 1503, a capacity of power distribution in a zone 1504 located upstream of the zone 1503, and an installation capacity of a distributing substation 1505 which distributes power to customers via feeders 1,2. The power distribution installation control system 1408 manages locations and capacities of those installations. As described above, the charge/discharge reward information transmitted from the charge management central server 0217 is given according to the region or for each charge/discharge control apparatus 0101. This avoids too many coincident charge actions, thus enabling an operation of a distribution system with flexibility.

In a similar manner, an operation of an electric power transmission system can be improved in addition to taking an installation capacity restriction of the distribution system. For example, if an excessive power demand occurs in a certain region, and the transmission system has a difficulty in its stable operation or the like, the charge/discharge reward information which strongly encourages a restriction of a charging to the charge/discharge control apparatuses 0101 in the region is transmitted. This contributes a suitable operation of the whole transmission system. The power distribution installation control system 1408 manages locations of installations for the power transmission system and capacities of the installations. The capacities of the installations of the transmission system are a possible restriction of a charge/discharge action.

<<Fourth Embodiment>>

Figure 16:
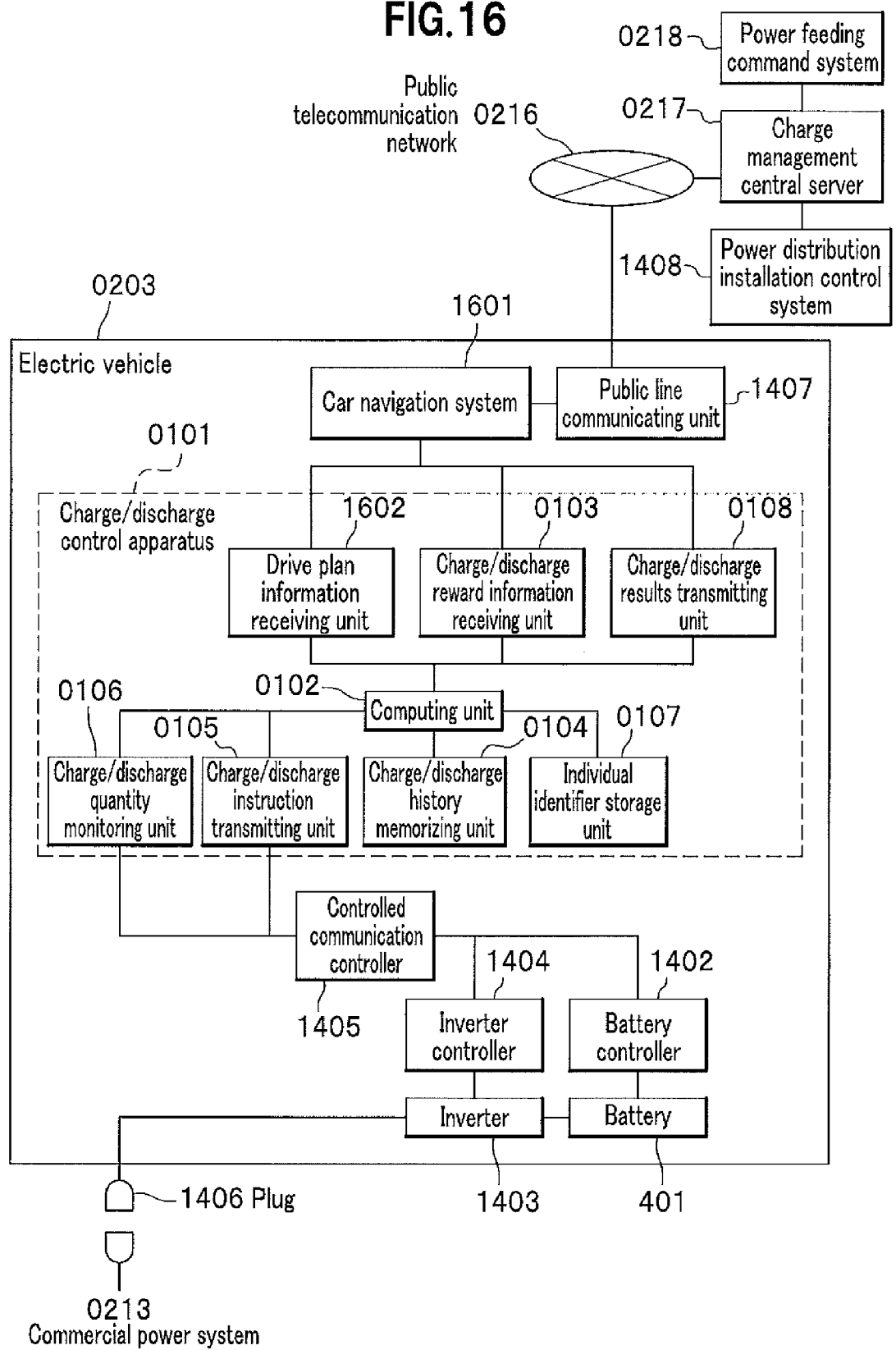
FIG. 16 is a block diagram illustrating a functional configuration of a charge station with a charge/discharge control apparatus mounted therein and relevant systems according to a fourth embodiment.

A fourth embodiment describes a system in which a charge/discharge apparatus of the present invention is mounted in an electric vehicle, like the third embodiment, and the charge/discharge apparatus manages a charge/discharge action of the electric vehicle while coordinating with a car navigation system also mounted in the electric vehicle. FIG. 16 shows a functional configuration of the system. The configuration and processing in the fourth embodiment are similar to those in the third embodiment. Next is described the fourth embodiment focusing on operations different from those in the third embodiment.

A car navigation system 1601 has an interface which can communicate information with the respective units of the charge/discharge control apparatus 0101. The car navigation system 1601 coordinates with the charge management central server 0217 using an information communication function of the public telecommunication network 0216 connected to the public line communicating unit 1407. The car navigation system 1601 (which may also be referred to as a positioning device) also has a positioning function. Similarly to the third embodiment, the function makes it possible to encourage a charge/discharge action according to a condition of a power distribution installation.

A drive plan information receiving unit 1602 grasps a drive plan prepared by the car navigation system 1601. The car navigation system 1601 sets a start point, a destination point, and a route for connecting the two points in advance according to well-known functions thereof. The car navigation system 1601 creates a drive plan in which at least a total drive distance and a drive start time are specified. The drive plan information receiving unit 1602 receives the drive plan. The charge/discharge control apparatus 0101 may perform a processing of converting a data in the drive plan according to a function of the car navigation system 1601. For example, if what is known in advance about a drive planned on the following day is only a total drive distance [km], the charge/discharge control apparatus 0101 converts the total drive distance by an average drive distance per 1 kWh [km/kWh] which is estimated from a performance of the electric vehicle 0203 and computes a charge storage quantity [kWh] necessary in the next morning. Note that the memory unit of the charge/discharge control apparatus 0101 stores the prepared drive plan. The drive start time is inputted from, for example, an input device of the car navigation system 1601.

If information known from the drive plan is not the total drive distance [km] but a drive distance [km] to an installation which provides a charging service and is located on the route to the destination point, the charge/discharge control apparatus 0101 performs a similar processing of conversion. If the car navigation system 1601 has a function of estimating a necessary energy based on gradient or possible traffic congestion on the road to be driven with high accuracy, the drive plan information receiving unit 1602 can compute a necessary charging quantity [kWh] just by grasping (receiving) a necessary energy quantity.

In either case, the computing unit 0102 creates a charge/discharge plan with reference to the drive plan received by the drive plan information receiving unit 1602.

Figure 17:
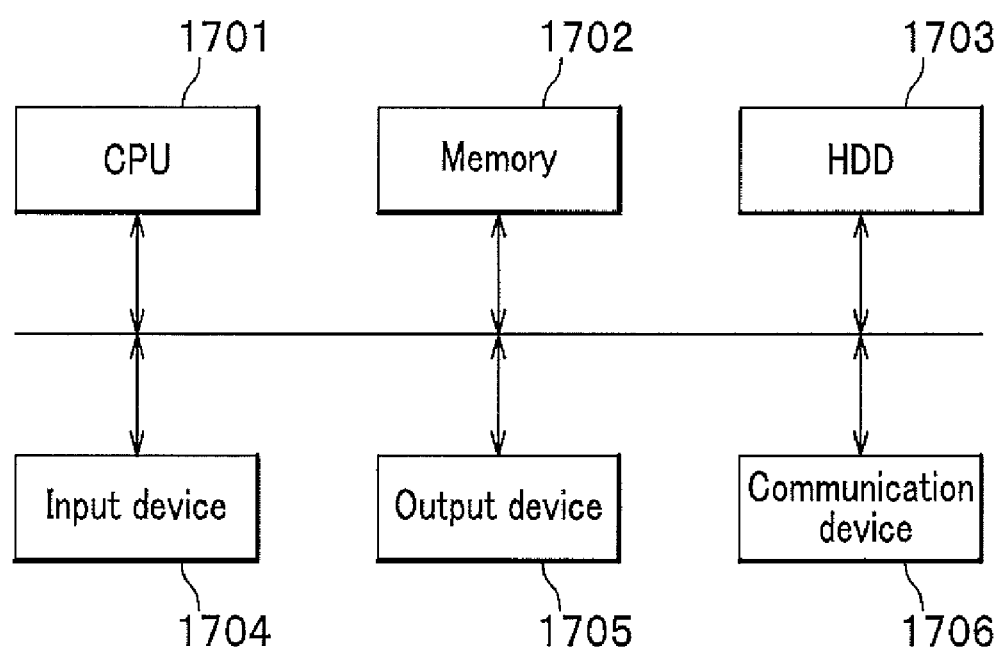
FIG. 17 is a block diagram illustrating a hardware configuration of the charge/discharge control apparatus according to the first to fourth embodiments.

The charge/discharge control apparatus in each of the embodiments is embodied by a computer having a hardware configuration shown in FIG. 17. The charge station 0201 and the electric vehicle 0203 with the charge/discharge control apparatus mounted therein also have such a hardware configuration. The charge/discharge control apparatus has hardware resources including: a CPU (Central Processing Unit, which may also be referred to as a control unit) 1701; a memory 1702 (which may also be referred to as a memory unit) embodied by a RAM (Random Access Memory) functioning as a memory area; a HDD (Hard Disk Drive, which may also be referred to as a memory unit) 1703 embodied by an external storage device for storing therein a program which is to be read by the CPU 1701 for executing an information processing (mainly required for the periodic processing, see FIG. 3) or a database used when the information processing is executed; an input device 1704 (which may also be referred to as an input unit) embodied by a keyboard, a mouse, or the like; an output device 1705 (which may also be referred to as an output unit) embodied by a display or the like; and a communication device 1705 for realizing communication with an external computer.

The control unit may read a program from a ROM (Read Only Memory, which may also be referred to as a memory unit) with the program stored therein and execute an information processing. The program stored in a recording medium is installed in the memory unit. The control unit may perform a processing instructed by the installed program using a hardware.

The program stored in the memory unit of the charge/discharge control apparatus is loaded into the memory area and is executed by the CPU 1701. This realizes the execution of the information processing by the processing unit (computing unit 0102 or the like) embodying a functional configuration of the charge/discharge control apparatus.

The aforementioned hardware configuration has the above described components each as a computer, such as the charge management central server 0217 (which is an external computer), power feeding command system 0218, vehicle assignment control system 1103 (which is an external computer), power distribution installation control system 1408, and car navigation system 1601.

In conclusion, a charge/discharge action which benefits an overall power system or a whole society can be encouraged by connecting or mounting the charge/discharge control apparatus according to the embodiments to or on a charge storage installation using a secondary battery such as an electric vehicle.

Upon coordinating with a power feeding instruction system, the charge/discharge control apparatus facilitates a charge/discharge action which contributes to a total optimization from a perspective of a supply-demand balance, a reserved capacity, or a voltage stability. Upon coordinating with a power distribution installation managing system, the charge/discharge control apparatus is expected to maintain a stable operation of a power distribution installation and reduce an unnecessary capital investment.

From a viewpoint of a user (customer), the charge/discharge control apparatus according to the embodiments measures a charge/discharge action, to thereby quantitatively prove the degree of contribution to society as described above. The user can enjoy a benefit such as a refund and service according to the degree of contribution. Upon coordinating with a vehicle assignment control system for a vehicle assignment business or a car navigation system for a private vehicle, the charge/discharge control apparatus makes it possible for the user to finish a charging in time with an optimal charging quantity so as to realize a drive plan, and to optimize a relation between a cost accompanying a charge action and an income obtained by a discharge action without losing comfortable usage of the electric vehicle or the like.

The exemplary embodiments of the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

For example, the charge/discharge reward information according to the embodiments may be created using a known technique based on a flow constraint of each power transmission line which is computed from a power supply reliability processing of a regional power transmission network of a power system in the charge management central server 0217. Further, the charge/discharge reward information may be created based on a flow constraint of each power distribution line which is computed from an installation management processing of a regional power distribution network of a power system in the charge management central server 0217.

The results of charging/discharging according to the embodiments are transmitted to the charge management central server 0217. Herein, the charge management central server 0217 may have a function of adding up results of charging/discharging received one after another and sequentially managing a total quantity of rewards for a charge/discharge action for each customer.

If a power generator used in a power feeding plan is an atomic power generator, the charge/discharge reward information may be created such that a charge/discharge action via the atomic power generator earns a higher reward point. This encourages spread of atomic power generators.

A specific configuration of a hardware, a software, a flowchart, or the like can be modified where necessary, without departing from the spirit and scope of the claims.

The invention claimed is:

1. A charge/discharge control apparatus for monitoring and controlling a charging of one or more electric power installations, comprising:
   a memory unit that:
      receives, out of charge/discharge reward information which specifies rewards which are set by region for each prescribed time zone such that a user of the electric power installation can enjoy a reward by performing an action of the charging to the electric power installation and restrictions which are set by region for each prescribed time zone on conducting the charging of the electric power installation, at least a reward and a restriction in a region corresponding to a charging position where a charging is conducted, from an external computer, and
      memorizes the at least the reward and the restriction, together with individual identification information for identifying the charge/discharge control apparatus itself; and
   a control unit that provides controls of:
      creating a charge/discharge plan covering from a start to an end of a charging of an electric power installation by a user, based on the charge/discharge reward information, such that the reward is maximized, according to the region corresponding to the charging position, the restriction according to the region corresponding to the charging position is satisfied, and the charging is completed before a usage start time of the electric power installation by the user,
      instructing the electric power installation to start or finish a charging according to the created charge/discharge plan,
      monitoring the charging conducted to the electric power installation, and
      transmitting results of the charging including contents of the conducted charging and the individual identification information, to the external computer.

2. The charge/discharge control apparatus according to claim 1,
   wherein the memory unit memorizes history information including a charging quantity or a discharging quantity of a charging or a discharging conducted for the electric power installation on a daily basis, and wherein the control unit computes an average value of the charging quantities or the discharging quantities for a prescribed number of days included in the history information, and creates the charge/discharge plan of the following day using the computed average value.

3. The charge/discharge control apparatus according to claim 2, wherein the electric power installation is a charging type mobile vehicle, is connected to a switch of a charging plug for use in a charging of the charging type mobile vehicle as an output destination in the instruction, is also connected to a voltmeter for measuring a power quantity passing the charging plug in the monitoring, and is mounted in a charging installation for providing a charging service to the charging type mobile vehicle.

4. The charge/discharge control apparatus according to claim 3, wherein the control unit receives from a unit into which vehicle identification information for identifying the charging type mobile vehicle is inputted, the vehicle identification information and creates the charge/discharge plan for the identified charging type mobile vehicle.

5. The charge/discharge control apparatus according to claim 4, wherein the control unit transmits the vehicle identification information to an external computer and receives, from the external computer, a drive plan including at least a drive start time and a scheduled drive distance of the identified charging type mobile vehicle, and creates the charge/discharge plan for the identified charging type mobile vehicle.

6. The charge/discharge control apparatus according to claim 1,
wherein the electric power installation is a charging facility mounted in the charging type mobile vehicle, and
wherein the charge/discharge control apparatus is mounted in the charging type mobile vehicle and is connected to a controlled communication controller of the charging facility which is a target of the instruction and the monitoring.

7. The charge/discharge control apparatus according to claim 6,
wherein the charging type mobile vehicle has a positioning device for detecting a location of the charging type mobile vehicle itself as positioning information, and
wherein the control unit transmits the positioning information to an external computer, receives the charge/discharge reward information as the restriction, in which a region where the user can receive the reward is set, from the external computer, and creates the charge/discharge plan based on the charge/discharge reward information.

8. The charge/discharge control apparatus according to claim 7,
wherein the positioning device is a car navigation system which sets a start point, a destination point, and a route for connecting the start point and the destination point and creates a drive plan in which at least a total drive distance and a drive start time are specified, and
wherein the control unit computes a power consumption required for a drive of the charging type mobile vehicle based on the drive plan and creates the charge/discharge plan using the computed power consumption.

9. The charge/discharge control apparatus according to claim 1, wherein the charge/discharge reward information is created based on a limit fuel cost or a limit greenhouse effect gas emission quantity computed in the external computer from a demand estimation processing of a whole power system, a start-and-stop plan processing of a plurality of power generators connected to the power system, and an economical load dispatching processing.

10. The charge/discharge control apparatus according to claim 1, wherein the charge/discharge reward information is created based on a reserved capacity of power feeding computed in the external computer from a demand estimation processing of a whole power system, a start-and-stop plan processing of a plurality of power generators connected to the power system, and an economical load dispatching processing.

11. The charge/discharge control apparatus according to claim 1, wherein the charge/discharge reward information is created based on a flow constraint of each power transmission line which is computed in the external computer from a power supply reliability processing of a regional power transmission network of a power system.

12. The charge/discharge control apparatus according to claim 1, wherein the charge/discharge reward information is created based on a flow constraint of each power distribution line which is computed in the external computer from an installation management processing of a regional power distribution network of a power system.

13. The charge/discharge control apparatus according to claim 1, wherein the results of charging/discharging is transmitted to the external computer which adds up the results of charging/discharging received one after another and sequentially manages a total quantity of rewards for a charge/discharge action for each customer.

14. The charge/discharge control apparatus according to claim 1, wherein the charge/discharge reward information includes a value which is obtained by quantifying a service to be provided to a user who conducts a charge action or a discharge action in a unit quantity, and the value is specified for each prescribed time in a future prescribed time period.

15. The charge/discharge control apparatus according to claim 14, wherein the service is redeemable as a monetary value for a usage specified in advance.

16. The charge/discharge control apparatus according to claim 14, wherein the service has a non-monetary value quantitatively representing a great contribution to society.

17. A computer-effected charge/discharge control method for monitoring and controlling a charging of one or more electric power installations, the charge/discharge control method comprising:
receiving, out of charge/discharge reward information which specifies rewards which are set by region for each prescribed time zone such that a user of the electric power installation can enjoy a reward by performing an action of the charging to the electric power installation and restrictions which are set by region for each prescribed time zone on conducting the charging of the electric power installation, at least a reward and a restriction in a region corresponding to a charging position where a charging is conducted, from an external computer, and
memorizing the at least the reward and the restriction, together with individual identification information for identifying the charge/discharge control apparatus itself;
creating a charge/discharge plan covering from a start to an end of a charging of an electric power installation by a user, based on the charge/discharge reward information, such that the reward is maximized, according to the region corresponding to the charging position, the restriction according to the region corresponding to the charging position is satisfied, and the charging is completed before a usage start time of the electric power installation by the user, instructing the electric power installation to start or finish a charging according to the created charge/discharge plan, monitoring the charging conducted to the electric power installation, and transmitting results of the charging including contents of the conducted charging and the individual identification information, to the external computer.

18. A non-transitory computer-readable medium embodying a program to execute a computer-effected charge/discharge control method for monitoring and controlling a charging of one or more electric power installations, the charge/discharge control method comprising:

receiving, out of charge/discharge reward information which specifies rewards which are set by region for each prescribed time zone such that a user of the electric power installation can enjoy a reward by performing an action of the charging to the electric power installation and restrictions which are set by region for each prescribed time zone on conducting the charging of the electric power installation, at least a reward and a restriction in a region corresponding to a charging position where a charging is conducted, from an external computer, and memorizing the at least the reward and the restriction, together with individual identification information for identifying the charge/discharge control apparatus itself;

creating a charge/discharge plan covering from a start to an end of a charging of an electric power installation by a user, based on the charge/discharge reward information, such that the reward is maximized, according to the region corresponding to the charging position, the restriction according to the region corresponding to the charging position is satisfied, and the charging is completed before a usage start time of the electric power installation by the user, instructing the electric power installation to start or finish a charging according to the created charge/discharge plan, monitoring the charging conducted to the electric power installation, and transmitting results of the charging including contents of the conducted charging and the individual identification information, to the external computer.

* * * * *